3,308,070
Patented Mar. 7, 1967

3,308,070
REFRACTORY CATALYST CARRIER AND
METHOD OF PREPARATION THEREOF
Eldon D. Miller, Jr., Bridgeville, Pa., assignor to Harbison-Walker Refractories Company, Pittsburgh, Pa., a corporation of Pennsylvania
No Drawing. Filed May 10, 1963, Ser. No. 279,612
10 Claims. (Cl. 252—455)

This invention relates to basic refractory compositions and, more particularly, to basic refractory compositions having particular utility as catalyst carriers.

It is well known that nickel can be used as a catalyst for a great number of different reactions. For example, nickel has been in significant demand as a catalyst in hydrogenation and dehydrogenation reactions, reductions of all kinds, desulfurization reactions, and in the cracking of hydrocarbons. Generally speaking, the nickel catalyst is introduced into the reaction zone on a suitable support (or "catalyst carrier") which is inert under the reaction conditions involved. A conventional procedure of placing the nickel on the catalyst carrier involves the impregnation of the carrier with a solution of a nickel salt (such as nickel sulfate), followed by the reduction of the salt to elemental nickel through treatment with a reducing gas, ordinarily hydrogen.

One of the primary objectives in the preparation of such supported nickel catalysts has been the provision of a support which is not only inert under the reaction conditions involved but which has a sufficiently large surface area to carry the proper quantity of nickel. In addition, the support must be fabricated of a material which will withstand the preliminary operations required to transfer the nickel or nickel-containing material on to the surface of the support and the subsequent conversion of such material to the elemental state if this is desired.

In accordance with the present invention, it has now been discovered that a catalyst carrier which is particularly advantageous for the preparation of nickel-supported catalyst can be readily fabricated. It has further been discovered that such catalyst carrier can be fabricated utilizing basic refractory material by means of a technique heretofore thought to be unsatisfactory for the preparation of basic refractory materials.

It is accordingly a primary object of the present invention to provide a novel basic refractory material particularly useful for the manufacture of catalyst carriers.

It is another important object of the present invention to provide a novel refractory material particularly useful for the fabrication of supported nickel catalyst and which material is chemically basic, has a bulk density between about 45 and 55 p.c.f., a porosity of at least about 60% and a permeability of at least about 35 units [1] and which is resistant to attack by alkalies and substantially chemically inert to nickel sulfate.

It is a further important object of the present invention to provide a fired, chemically basic refractory material particularly useful as a catalyst carrier and which is made from a mixture consisting essentially of expanded perlite, a low ash burn-out material, and at least one member selected from the group consisting of such as olivine, chrome ore, alumina, aluminum ores, ball clay and dead burned magnesite. One can also add small amounts of other art recognized basic materials such as dolomite, lime, forsterite, etc. From a chemical standpoint, in general it relates to refractory material mixtures containing "excess" magnesia. By "excess" we mean more magnesia than required to just about react with the available silica in the batch to form forsterite.

It is still a further important object of the present invention to provide a novel chemically basic refractory material particularly advantageous for use as a catalyst carrier and to which is imparted desirable bulk density, porosity and permeability characteristics by means of an organic, low ash burn-out material.

It is another primary object of the present invention to provide a novel method for making a fired, chemically basic refractory material which is resistant to attack by alkalies and substantially chemically inert to nickel sulfate, which has a bulk density between about 45 and 55 p.c.f., a porosity of at least about 60% and a permeability of at least about 35 units,[1] comprising making said refractory material from a mixture of expanded perlite and a material selected from the group consisting of such as olivine, chrome ore, alumina, aluminum ores, ball clay, dead burned magnesite and small amounts of other art recognized basic materials such as dolomite, lime, forsterite, etc., the particular bulk density, porosity and permeability characteristics being imparted by means of a low ash burn-out material.

It is another important object of the present invention to provide a chemically basic, relatively porous, permeable, ceramically bonded refractory material suitable for use as a catalyst carrier which is resistant to attack by alkalies and relatively chemically inert to nickel sulfate, said refractory material being comprised predominantly of a stabilized forsterite structure and having a bulk density between about 45 and 55 p.c.f., a porosity of at least about 60% and a permeability of at least about 35 units.[1]

These and other important objects and advantages of the present invention will become more apparent upon reference to the ensuing description and appended claims.

In accordance with the present invention, it has been discovered that the above objects and advantages can be attained and the novel basic refractory material provided from a composition comprising, on a solids basis and in weight percent, 15–25% of expanded perlite, about 5–25% of a low ash burn-out material, and the remainder heavy (at least about 80 p.c.f. bulk density) refractory aggregate, at least 25 weight percent and suitably at least 40 weight percent of the total solids being dead burned magnesite. In addition, a bonding agent to provide strength in the green or unfired state can be included along with an aqueous tempering fluid and, if desired, a small addition of clay for workability. The resulting compositions can be formed to the desired shape by conventional compaction techniques and fired under suitable conditions to obtain the desired end product.

The aggregate content of compositions in accordance with the present invention can consist entirely of dead bured magnesite. Alternatively, part of the dead burned magnesite can be replaced by other materials. The magnesite supplies free magnesia that reacts with the perlite to form forsterite, thereby providing a stabilized structure for the resulting shape. Some of the materials that can be substituted for part of the dead burned magnesite react with magnesia at approximately the same conditions at which perlite and dead burned magnesite react. Accordingly, such additives or substitutes for dead burned magnesite are used in limited quantities that permit sufficient magnesia to remain for substantially complete reaction with the perlite. Where no loss of magnesia occurs

---

[1] When used in this specification and claims, units of permeability will be construed to be expressed in terms of cu. in./sec./sq. in. of area/in. thickness/p.s.i. pressure and represents the volume of dry air, measured at room temperature and atmospheric pressure, which will flow through a 1" cube of test material in one second under a pressure differential of 1 p.s.i. The permeability is determined by the following formula:

$$\text{Permeability} = \frac{\text{flow rate (cc./min.)} \times \text{thickness (in.)} \times 0.00526}{\text{area (in.}^2\text{)} \times \text{pressure (cm. of Hg)}}$$

through reaction of an additive with the magnesite, a greater quantity of the dead burned magnesite can be substituted while meeting the requirement for forming the stabilized forsterite structure.

By way of example of the foregoing, olivine in amounts up to about 40 weight percent of the total aggregate can be used in conjunction with the magesite. Olivine is a solid solution mineral containing forsterite ($2MgO.SiO_2$) and fayalite ($2FeO.SiO_2$) in varying proportions. It is chemically compatible with magnesia and with the silica of the perlite. The following is a typical analysis, in weight percent, of olivine:

| | Percent |
|---|---|
| $SiO_2$ | 39.7 |
| $Al_2O_3$ | 0.7 |
| FeO | 9.1 |
| $Cr_2O_3$ | 1.0 |
| CaO | 0.3 |
| MgO | 46.6 |
| Loss | 2.5 |

The upper figure of 40% with respect to the amount of olivine which can be used represents a limit beyond which the magnesia content would be inadequate to porvide the stable structure desired upon reaction with the perlite. The olivine also contributes to the low density, adequate strength, high refractoriness and dimensional stability of the final basic refractory material.

Similarly, up to 25 weight percent of the total aggregate can be chrome ore. A typical analysis of Philippine chrome ore, one of the chrome ores available and which can be used in the present invention, is as follows:

| | Percent |
|---|---|
| $SiO_2$ | 4.9 |
| $Al_2O_3$ | 29.9 |
| FeO | 12.8 |
| $Cr_2O_3$ | 32.4 |
| CaO | 0.5 |
| MgO | 17.8 |
| Loss | 0.9 |

Here again, the chrome ore contributes to the low bulk density, adequate strength for handling, high refractoriness and dimensional stability of the final product. In addition, the presence of chrome ore contributes to increased resistance to spalling of the final product.

Still further, alumina in amounts up to 20 weight percent can be substituted for part of the dead burned magnesite. The analysis of Bayer process alumina, which is suitable for use in the present invention, is as follows:

| | Percent |
|---|---|
| $Al_2O_3$ | 99.4 |
| $SiO_2$ | 0.3 |
| $Fe_2O_3$ | 0.2 |
| Alk. earths | 0.1 |

The presence of alumina in the composition of the present invention is extremely valuable in providing a stable structure through the formation of an $MgO.Al_2O_3$ spinel bond. It is also to be noted that alumina can be included even where portions of the magnesite are substituted by olivine. The addition of alumina to a mix containing magnesite and olivine results in a more stable structure through the combination of the forsterite and $MgO.Al_2O_3$ spinel bond. The alumina also stabilizes the iron oxide that is present in the olivine.

Ternary mixtures including, for example, up to 20% of alumina, up to 40% of olivine and the remainder dead burned magnesite have also been found to be highly advantageous.

For some purposes, such as providing workability of the batch and enhancing the green strength, a small amount of a material such as ball clay can be used. Where clay, such as ball clay, is used for those purposes, it generally is provided in an amount up to about 5 weight percent based on the solids content of the batch. However, ball clay can also be used in limited amounts as a substitute for part of the magnesite. For example, mixtures of dead burned magnesite and ball clay, where the latter comprises up to about 25 weight percent of the total aggregate, are usable with success. Analysis of a typical ball clay, which produces particularly satisfactory results in the present invention, is as follows:

| | Percent |
|---|---|
| $SiO_2$ | 53.6 |
| $Al_2O_3$ | 30.3 |
| $Fe_2O_3$ | 0.9 |
| CaO | 0.49 |
| $TiO_2$ | 1.7 |
| Alkalies | 0.41 |
| Ingition loss | 12.4 |

The use of clay in the brick results in considerably higher strength than in those ternary mixtures in which olivine and alumina are used, thereby providing easier handling of the resultant product. Moreover, the batches with clay are more easily worked as a consequence of the presence of the clay. However, the use of clay in amounts of more than 25 percent of the total solids brings about a condition where too little magnesia is then available to be converted into forsterite when the body is burned. Consequently, the pressed body will not retain its form upon firing.

Dead burned magnesite, especially that prepared from sea water, constitutes the preferred aggregate in the composition of the present invention for it provides a higher refractoriness than can be obtained with any of the mixtures indicated or with that obtained with natural dead burned magnesite. Typical analyses of dead burned natural and sea-water magnesites are as follows:

| Nevada magnesite: | Percent |
|---|---|
| MgO | 85.7 |
| CaO | 5.09 |
| $SiO_2$ | 4.34 |
| $Fe_2O_3$ | 4.05 |
| $Al_2O_3$ | 0.79 |
| Seawater magnesite: | |
| MgO | 95.1 |
| CaO | 1.3 |
| $SiO_2$ | 2.7 |
| $Fe_2O_3$ | 0.6 |
| $Al_2O_3$ | 0.3 |

It will be realized that ternary mixtures of dead burned magnesite, chrome ore and olivine and of dead burned magnesite, alumina and chrome ore are also contemplated in the compositions of the present invention, as well as the substitution of alumina by clay in the various blends.

The particle size of the dead burned magnesite content of the heavy aggregate used in the invention should be quite fine, substantially all passing a 65 mesh Tyler screen. The other heavy aggregate usually is at least as fine as minus 28 mesh and can pass a 325 mesh screen as when fine-ground alumina or air-floated ball clay is used. The magnesite must be fine to be sufficiently reactive with perlite during firing. It is known that the magnesite reacts with the perlite melt formed when the material is heated, forming forsterite and spinel. Thus, the perlite is retained within the resulting refractory structure by combining with or being absorbed into the magnesia, thereby resulting in a large volume of voids. The reactivity requirement between the perlite and magnesite places a practical limit on the type and quantity of aggregate that can be substituted for part of the magnesite, for sufficient magnesia must remain available to react with the silica content of the perlite to form forsterite.

Expanded perlite constitutes the lightweight component in compositions within the present invention. Expanded perlite is a lightweight, easily crushed, globular, glassy, particle which is predominantly alumina and silica with some alkalies. Expanded perlite softens and melts at temperatures below about 2000° F. but compositions of the present invention are designed to take advantage of this fact. It is thought that the perlite is retained within the resulting refractory structure by combining with or being absorbed into the more refractory constituents of the batch, i.e., the magnesite. It has been found that the perlite combines with the magnesite to form forsterite, magnesium orthosilicate. A typical perlite composition is, in weight percent, as follows:

| | Percent |
|---|---|
| SiO$_2$ | 70 |
| Al$_2$O$_3$ | 15 |
| Fe$_2$O$_3$ | 2 |
| MgO | 1 |
| CaO | 1 |
| Alkalies | 7 |
| Ignition loss | 4 |

The size of the expanded perlite particles is not critical, but it has been found that material substantially all of which passes a 6 mesh Tyler screen and not more than 10% of which passes a 150 mesh Tyler screen gives an extremely satisfactory product.

In addition to the foregoing, an essential ingredient of the compositions of the present invention is from 5 to 25 weight percent on a solids basis of a low ash burn-out material. The addition of this ingredient to the batch used in preparing the basic refractory material of the present invention is extremely important in rendering such material usable as a catalyst carrier for material such as nickel since without this additive, the material which would otherwise result would be unsatisfatcory from a standpoint of density, porosity and the required ability to absorb the necessary quantity of catalyst.

While burn-out materials are known generally in the art, it is extremely surprising that the use of such materials, and particularly low ash organic burn-out materials, are usable in connection with the chemically basic refractory materials of the present invention since they had been previously thought to create reducing conditions during the burn-out process which would destructively reduce such conventional basic aggregates as chrome ore and dead burned magnesite. In accordance with the present invention, however, it has been discovered that the initial reducing conditions caused by coke burn-out have no noticeable effect on the burned product due to the creation of oxidizing conditions after a short period of time in the kiln. A particularly advantageous low ash burn-out material is petroleum coke. By means of such low ash burn-out materials the density and porosity of the resulting refractory product is reduced significantly without changing the mineralogy of the material.

As previously indicated, the low ash burn-out material should be present in a range of 5 to 25 weight percent on a solids basis. Less than 5% by weight of low ash burn-out would not impart sufficient porosity for most advantageous results; more than about 25% by weight of burn-out would not only tend to weaken the refractory structure unduly but would tend to cause the structure to shrink upon firing with the result that no additional bulk density benefits would be obtained from the presence of the burn-out material.

In preparing the chemically basic refractory material of the present invention, expanded perlite and the low ash burn-out material are mixed dry in a mixer for a brief period of time, i.e., 1 minute. The mixer should be of a type which will cause only a minimum breakdown of the fragile perlite particles, a tumbling type mixer having been found to be ideal for this purpose. An aqueous tempering fluid is then added to the perlite burn-out material mixture to temper the mixture, following which the entire mix is tumbled for an additional brief period, i.e., 3 minutes. Following this procedure, the aggregate components, such as dead burned magnesite and clay, after pre-blending, are added to the wet perlite burn-out material mixture and the entire batch tumbled for an additional few minutes, i.e., 3 minutes. Charges of the batch are then weighed and compacted into suitable shapes, i.e., 9" straights.

In making these brick, the prepared mix is charged to a hopper associated with a conventional refractory forming machine or system. With such a forming machine a predetermined amount, calculated to result in an unburned or green density on the order of 55–65 p.c.f. (pounds per cubic foot), is charged to each brick mold and the press then compacts the charge until the desired thickness has been achieved. Thereafter, the brick are dried at about 230° F. for a suitable period of time to remove moisture i.e., 16 hours) and the brick are thereafter fired at a temperature and for a period of time sufficient to permit the magnesite-perlite reaction to be completed. A suitable temperature for this purpose is between 2500° F. and 2700° F. for about 10 hours. The resulting fired, ceramically bonded brick may then be suitably subdivided into smaller shapes such as, for example, 1" cubes to adapt them for use as catalyst carriers as previously mentioned.

The resulting refractory material has properties which particularly adapts such material for use as a catalyst carrier in preparing nickel-supported catalysts. Generally speaking, such material is resistant to attack by alkalies, is substantially chemically inert to nickel sulfate (which may conveniently be used to impregnate the refractory to transfer the nickel to the refractory surface), has a fired bulk density between about 45 and 55 p.c.f., a porosity of at least about 60% (and preferably about 70%) and a permeability of at least about 35 and preferably about 40 units.[1]

A suggested example of the composition and process of the present invention, uses the following materials:

| Material— | Parts by weight |
|---|---|
| Magnesite (having a composition such as has been previously indicated; size: —65 mesh) | 75 |
| Ball clay (air-floated) | 5 |
| Perlite (—6 mesh and sized to obtain an overall size grading so that not more than 10% will pass through a 150 mesh Tyler screen) | 20 |
| | 100 |
| Petroleum coke (—6 mesh and sized to obtain an overall size grading so that not more than 10% will pass through a 150 mesh Tyler screen) | 15 |
| Lignin liquor | 2 |
| Water | 8 |
| | 25 |

The perlite and petroleum coke are mixed dry in a tumble-type mixer for 1 minute. A mixture of the lignin liquor and water is then added to the perlite-petroleum coke mix to temper the perlite-coke mixture and the batch tumbled for 3 minutes. Dry premixed magnesite fines and ball clay are added to the tempered perlite-petroleum coke mixture and tumbled for an additional 3 minutes. The entire batch is then pressed into 9" straights (nominally 9 x 4½ x 2½ inches). All of the brick are dried at 230° F. for 16 hours to remove moisture from them.

As previously indicated, the finished chemically basic refractory material of the present invention may be subdivided following the firing step to form sub-units particularly useful as a catalyst carrier. For example, a nickel-supported catalyst may be readily formed by impregnating the subdivided catalyst carrier with an aqueous solution of nickel sulfate. The impregnated catalyst carrier may then be dried and the nickel sulfate converted to metallic elemental nickel by reducing the nickel sulfate with a reducing gas such as hydrogen at a temperature in the range of 400 to 700° C. The resulting product may be used for any of the uses previously indicated for nickel catalysts, a particularly advantageous use being as a hydrogenation catalyst in a process such as is described in Patent Number 2,967,200 for the preparation of ketoximes.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

Having thus described the invention in detail and with sufficient particularity as to enable those skilled in the art to practice it, what is desired to have protected by Letters Patent is set forth in the following claims.

I claim:

1. A chemically basic, ceramically bonded relatively porous, permeable refractory material suitable for use as a catalyst carrier and made from a size-graded batch comprising, on a solids basis and in weight percent, about 15 to 25% expanded perlite, about 5 to 25% of a low ash organic burnout material, at least about 25% dead burned magnesite, the remainder heavy refractory aggregate, said refractory material being resistant to attack by alkalies and substantially chemically inert to nickel sulfate; said refractory material having a bulk density between about 45 and 55 p.c.f., a porosity of at least about 60% and a permeability of at least about 35 units, said batch being formed into shapes and fired for a sufficient time at a sufficient temperature to develop a ceramic bond.

2. A refractory material as defined in claim 1 wherein said low ash burnout material is petroleum coke.

3. A catalyst material consisting essentially of nickel supported on a catalyst carrier consisting essentially of a fired, chemically basic refractory material which is resistant to attack by alkalies and substantially chemically inert to nickel sulfate, which has a bulk density between about 45 and 55 p.c.f., a porosity of at least about 60% and a permeability of at least about 35 units, and which is made from a mixture consisting essentially of, on a solids basis and in weight percent: about 15 to 25% expanded perlite, about 5 to 25% of a low ash organic burnout material, at least one member selected from the group consisting of (a) up to about 40% olivine, (b) up to about 25% chrome ore, (c) up to about 20% alumina, (d) up to about 25% ball clay, and the remainder dead burned magnesite, the magnesite content being at least about 25% of the total solids, said batch being formed into shapes and fired for a sufficient time at a sufficient temperature to develop a ceramic bond.

4. A method of making a fired, chemically basic refractory material which is resistant to attack by alkalies and substantially chemically inert to nickel sulfate, which has a bulk density between about 45 and 55 p.c.f., a porosity of a least about 60% and a permeability of at least about 35 units, comprising: preparing a mixture consisting esesntially of, on a solids basis and in weight percent: about 15 to 25% expanded perlite, about 5 to 25% of a low ash organic burnout material, at least one member selected from the group consisting of (a) up to about 40% olivine, (b) up to about 25% chrome ore, (c) up to about 20% alumina, (d) up to about 25% ball clay, and the remainder dead burned magnesite, the magnesite content being at least about 25% of the total solids: and firing said mixture to cause sufficient burnout of said low ash burnout material to result in a refractory material of the properties previously enumerated.

5. A method as defined in claim 4 wherein, prior to said firing step, said mixture is compacted and wherein said firing step results in a ceramically bonded refractory material.

6. A method as defined in claim 5 wherein said compacted mixture has a green bulk density prior to said firing step of about 55–65 p.c.f.

7. A method as defined in claim 6 wherein said compacted mixture is dried prior to said firing step.

8. A method as defined in claim 7 wherein said firing step is carried out at a temperature of at least about 2500° F.

9. The method according to claim 4 comprising tempering a mixture of about 20 parts, by weight, of expanded perlite, about 15 parts, by weight, of petroleum coke, with about 10 parts, by weight, of aqueous tempering fluid; adding to and mixing with said tempered perlite-petroleum coke mixture about 75 parts, by weight, of magnesite, and about 5 parts, by weight, of ball clay, and firing said mixture at a temperature between about 2500° F. and 2700° F.

10. A refractory material according to claim 1 made from a batch consisting essentially of, on a solids basis and in weight percent, about 20 parts expanded perlite, about 15 parts petroleum coke, and about 10 parts aqueous tempering fluid, about 75 parts of magnesite, and about 5 parts of ball clay.

References Cited by the Examiner

UNITED STATES PATENTS

| | | | |
|---|---|---|---|
| 2,360,929 | 10/1944 | Blaha | 106—41 X |
| 2,702,748 | 2/1955 | Heine | 106—41 |
| 3,008,842 | 11/1961 | Miller | 106—58 |

OSCAR R. VERTIZ, *Primary Examiner.*

E. J. MEROS, *Assistant Examiner.*